US011366265B2

(12) United States Patent
Mukhtarov et al.

(10) Patent No.: US 11,366,265 B2
(45) Date of Patent: Jun. 21, 2022

(54) DISPLAY APPARATUS

(71) Applicant: SAMSUNG ELECTRONICS CO., LTD., Suwon-si (KR)

(72) Inventors: Farid Mukhtarov, Suwon-si (KR); Dae Sik Kim, Suwon-si (KR); Yasuhiro Nishida, Suwon-si (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/278,131

(22) PCT Filed: Sep. 17, 2019

(86) PCT No.: PCT/KR2019/011962

§ 371 (c)(1),
(2) Date: Mar. 19, 2021

(87) PCT Pub. No.: WO2020/060136

PCT Pub. Date: Mar. 26, 2020

(65) Prior Publication Data

US 2021/0333469 A1    Oct. 28, 2021

(30) Foreign Application Priority Data

Sep. 19, 2018   (KR) .................. 10-2018-0112500

(51) Int. Cl.
*F21V 8/00*   (2006.01)
(52) U.S. Cl.
CPC ......... *G02B 6/0073* (2013.01); *G02B 6/0036* (2013.01); *G02B 6/0055* (2013.01)
(58) Field of Classification Search
CPC .. G02B 6/0073; G02B 6/0036; G02B 6/0055; G02B 6/007; G02B 6/0091
(Continued)

(56) References Cited

U.S. PATENT DOCUMENTS 5,654,779 A * 8/1997 Nakayama ................ F21S 8/00
345/905
2010/0067257 A1   3/2010 Meis et al.
(Continued)

FOREIGN PATENT DOCUMENTS

KR   1020100028439 A   3/2010
KR   1020100050276 A   5/2010
KR   1020160091855 A   8/2016

OTHER PUBLICATIONS

International Search Report (PCT/ISA/210) dated Jan. 20, 2020 issued by the International Searching Authority in International Application No. PCT/KR2019/011962.

*Primary Examiner* — Andrew J Coughlin
*Assistant Examiner* — Jessica M Apenteng
(74) *Attorney, Agent, or Firm* — Sughrue Mion, PLLC

(57) ABSTRACT

Provided is a display apparatus including a display panel, a light guide plate arranged behind the display panel, a light guide member configured to guide light toward a rear surface of the light guide plate, the light guide member formed of a transparent material and arranged to have a front surface come in contact with the rear surface of the light guide plate, and a light source configured to supply light to the light guide member, wherein the light guide member includes a light guide portion having a width and a length longer than the width and configured to guide widthwise movement of light supplied from the light source and an exit portion protruding forward from the light guide portion to guide the light to be emitted toward the rear surface of the light guide member.

10 Claims, 7 Drawing Sheets

(58) Field of Classification Search
USPC .......................................................... 362/97.1
See application file for complete search history.

(56) References Cited

U.S. PATENT DOCUMENTS

| | | |
|---|---|---|
| 2010/0110337 A1 | 5/2010 | Shin et al. |
| 2011/0134360 A1 | 6/2011 | Ueno et al. |
| 2013/0308343 A1 | 11/2013 | Baek et al. |
| 2016/0161660 A1 | 6/2016 | Kim et al. |
| 2018/0348423 A1* | 12/2018 | Vasylyev ............. G02B 6/0078 |

\* cited by examiner

DISPLAY APPARATUS

TECHNICAL FIELD

The disclosure relates to a display apparatus including a backlight for supplying light to a display panel.

BACKGROUND ART

A display apparatus is an output device that visually displays data information, such as characters and figures, and an image, and examples of the display apparatus includes a computer monitor or a television (TV).

The display apparatus includes a display panel formed of a liquid crystal panel and a backlight for supplying light to the display panel.

Among the display apparatuses, there is a display apparatus including a light guide plate and a backlight in which light emitting diodes (LEDs) are disposed opposite to both sides of the light guide plate and generating light.

The backlight including the light guide plate and the LEDs operates in a way of diffusing light generated from the LEDs through the light guide plate and supplying the light to the display panel in front of the backlight, and thus has a difficulty in performing local dimming that is achieved by partially restricting supply of light in a certain region of the display panel.

DISCLOSURE

Technical Problem

The disclosure is directed to providing a display apparatus having a backlight capable of implementing local dimming.

Technical Solution

One aspect of the disclosure provides a display apparatus including: a display panel; and a backlight arranged at a rear side of the display panel to supply light to the display panel, wherein the backlight includes: a light guide plate formed of a transparent material and arranged behind the display panel and a plurality of light source units disposed to be spaced apart from each other to supply light to a rear surface of the light guide plate; and the plurality of light source units include a light guide member formed of a transparent material and having a front surface come in contact with the rear surface of the light guide plate and a light source configured to supply light toward at least one of both side surfaces of the light guide member.

The light guide member may include a light guide portion having a width and a length longer than the width and configured to guide the light from the light source to be supplied in a direction along the width and an exit portion protruding forward from the light guide portion to guide the light to be emitted toward the rear surface of the light guide plate.

The exit portion may protrude forward from a center portion of a front surface of the light guide portion such that a front surface of the exit portion comes in contact with the rear surface of the light guide plate.

The light source may include a pair of substrates disposed opposite to widthwise both side surfaces of the light guide portion, and a plurality of light emitting diodes (LEDs) disposed on the pair of substrates to be spaced apart from each other lengthwise along the light guide plate.

The light guide member may include a pair of reflectors disposed on widthwise both side surfaces of the exit portion to reflect light.

The exit portion may protrude forward from a front surface of the light guide portion at one of widthwise both sides thereof to come in contact with the rear surface of the light guide plate.

The light source may include a substrate disposed opposite to an other side surface of the light guide portion located on the opposite side of the exist portion between widthwise both side surfaces of the light guide portion and a plurality of LEDs disposed on the substrate to be spaced apart from each other lengthwise along the light guide portion.

The light guide member may include one reflector covering one side surface between the widthwise both side surfaces of the light guide portion and one side surface between widthwise both side surfaces of the exit portion and another reflector covering an other side surface between the widthwise both side surfaces of the exit portion.

The exit portion may protrude to have a width that gradually decreases as being directed from the light guide portion toward the rear surface of the light guide plate so that a front surface of the exit portion comes in contact with the rear surface of the light guide plate.

The light source may include a pair of substrates disposed opposite to widthwise both side surfaces of the light guide portion, and a plurality of light emitting diodes (LEDs) disposed on the pair of substrates to be spaced apart from each other lengthwise along the light guide portion.

The light guide plate may include a fine pattern provided on the rear surface thereof and configured to guide light to be emitted forward, wherein the fine pattern may be formed on the rear surface of the light guide plate except for a region that comes in contact with the front surface of the light guide member.

The light guide member may include a fine pattern provided on a rear surface thereof and configured to guide light to be emitted forward, and the fine pattern may be formed on the rear surface of the light guide member at a position corresponding to the front surface of the light guide member that comes in contact with the light guide plate.

The light guide plate and the light guide member may include a fine pattern provided on rear surfaces thereof and configured to guide light to be emitted forward.

The backlight may further include reflectors covering the rear surface of the light guide plate and a rear surface of the light source unit.

The plurality of light source units may be disposed on the rear surface of the light guide plate to be spaced apart from each other in a left side and right side direction, the light guide member may be elongated in an upper side and lower side direction, the substrate may be disposed opposite to at least one of a left side surface and a right side surface of the light guide portion, and the plurality of LEDs may be disposed on the substrate to be spaced apart from each other in the upper side and lower side direction.

Another aspect of the disclosure provides a display apparatus including: a display panel; a light guide plate arranged behind the display panel; a light guide member configured to guide light toward a rear surface of the light guide plate, the light guide member formed of a transparent material and arranged to have a front surface come in contact with the rear surface of the light guide plate; and a light source configured to supply light to the light guide member, wherein the light guide member includes a light guide portion having a width and a length longer than the width and configured to guide widthwise movement of light supplied from the light source and an exit portion protruding forward from the light guide portion to guide the light to be emitted toward the rear surface of the light guide plate.

Advantageous Effects

As is apparent from the above, the display apparatus according to an aspect of the disclosure can perform a local dimming function by allowing light to be emitted only from a certain region of a light guide plate.

In addition, since a light source unit is disposed behind the light guide plate, a bezel in the display apparatus can be provided with a narrower bezel.

MODES OF THE DISCLOSURE

Figure 1:
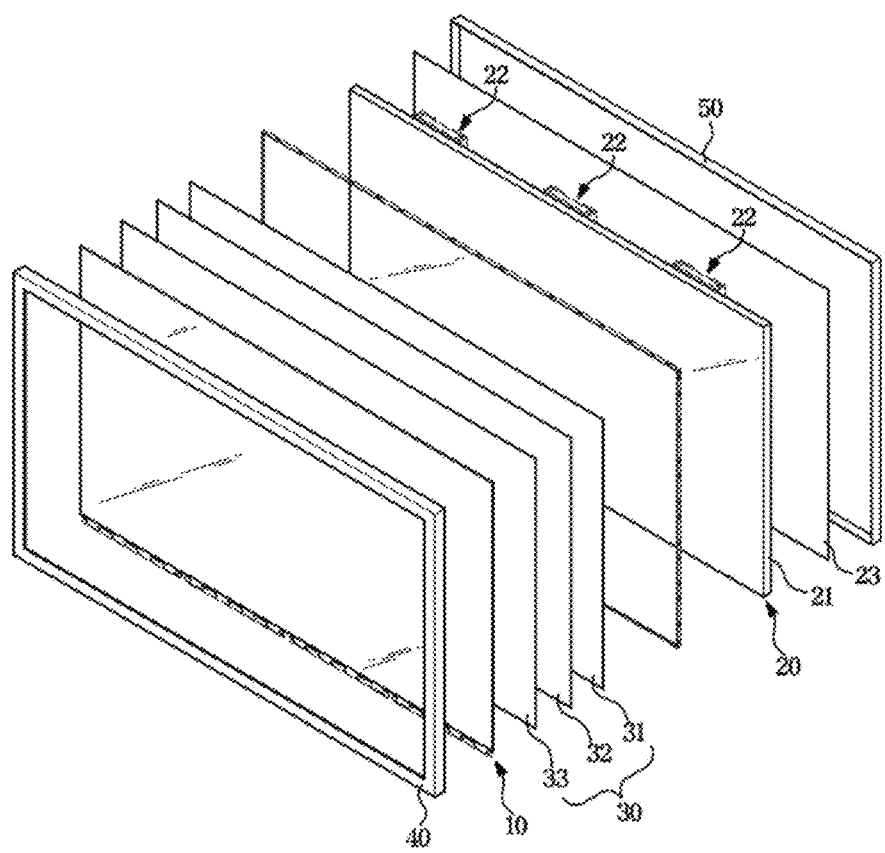
FIG. 1 is a perspective view illustrating a display apparatus according to the first embodiment of the disclosure.

The embodiments set forth herein and illustrated in the configuration of the disclosure are only the most preferred embodiments and are not representative of the full technical spirit of the disclosure, so it should be understood that they may be replaced with various equivalents and modifications at the time of the disclosure.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure. Descriptions shall be understood as to include any and all combinations of one or more of the associated listed items when the items are described by using the conjunctive term "~ and/or ~," or the like.

The terms "front", "rear", "upper", "lower", "top", and "bottom" as herein used are defined with respect to the drawings, but the terms may not restrict the shape and position of the respective components.

Hereinafter, a display apparatus according to the first embodiment of the disclosure will be described in detail with reference to the accompanying drawings.

Referring to FIG. 1, a display apparatus includes a display panel 10, a backlight 20 supplying light to the display panel 10, and a plurality of optical sheets 30 arranged between the backlight 20 and the display panel 10 to improve the characteristics of the light supplied from the backlight 20.

The display panel 10 is provided as a plate-shaped liquid crystal panel including plate shaped glass glasses and liquid crystal molecules interposed between the two glass substrates. The display panel 10 is formed in a rectangular plate shape having a width in a left and right side direction that is longer than a length in an upper and lower side direction.

The display apparatus includes a case 40 forming the external appearance of the display apparatus and supporting the outer peripheral region of the display panel 10, a middle mold 50 supporting the display panel 10 and the optical sheets 30, and a bottom chassis 60 coupled to the middle mold 50 at a front side thereof and accommodating the backlight 20.

The case 40 is formed in a substantially rectangular ring shape to support an outer peripheral region of a front surface of the display panel 10 and forms an outer peripheral region of a front surface and side surfaces of the display apparatus.

The middle mold 50 is formed in a substantially quadrangular ring shape to support an outer peripheral region of a rear surface of the display panel 10 and the optical sheets 30.

The bottom chassis 60 is formed in a case shape with an open front surface to accommodate the backlight 20 therein. The bottom chassis 60 is formed of a metal material, such as aluminum, having excellent thermal conductivity.

The bottom chassis 60 is provided with a rear surface thereof with various printed circuit boards (not shown) for controlling the display apparatus, and is coupled at a rear side thereof to a rear case (no shown) covering the printed circuit boards while forming the rear surface of the display apparatus.

Figure 2:
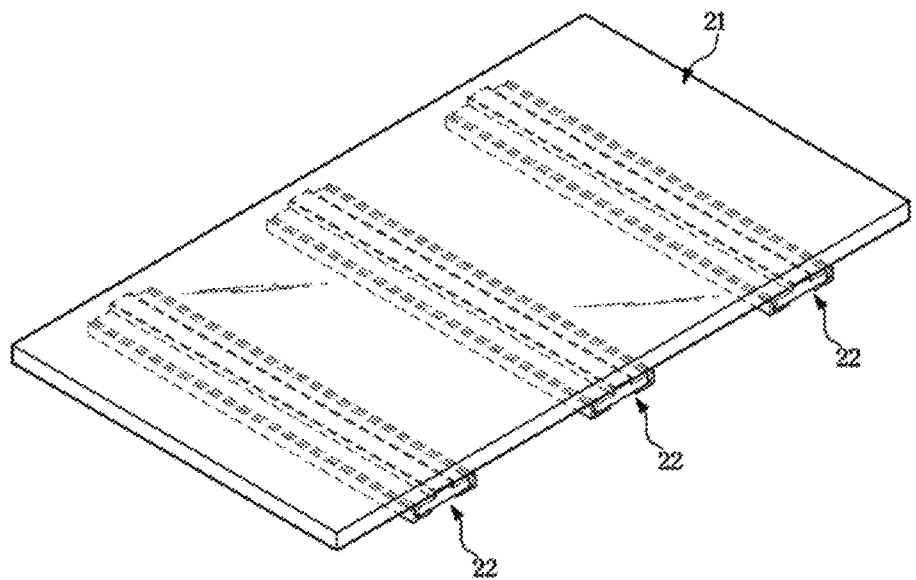
FIG. 2 is a perspective view illustrating a backlight included in the display apparatus according to the first embodiment of the disclosure.

Referring to FIG. 2, the backlight 20 includes a display panel 10, a light guide plate 21 arranged at a rear side of the display panel 10, and a plurality of light source units 22 arranged at a rear side of the light guide plate 21 to supply light to the rear surface of the light guide plate 21.

Figure 3:
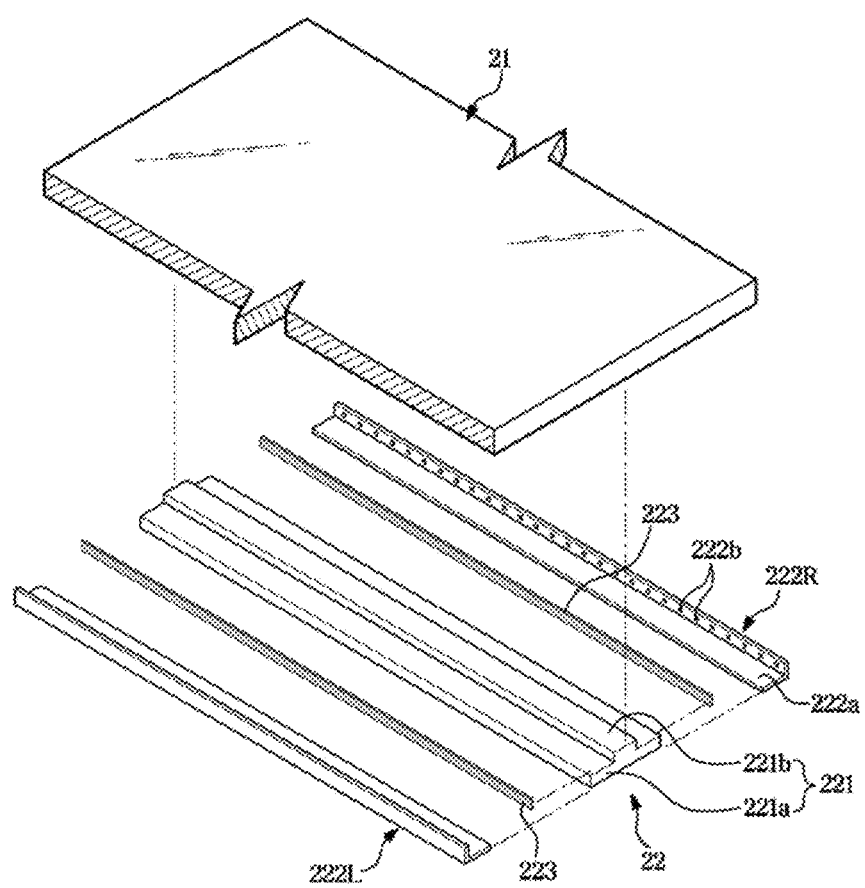
FIG. 3 is an exploded perspective view illustrating the backlight included in the display apparatus according to the first embodiment of the disclosure.
Figure 4:
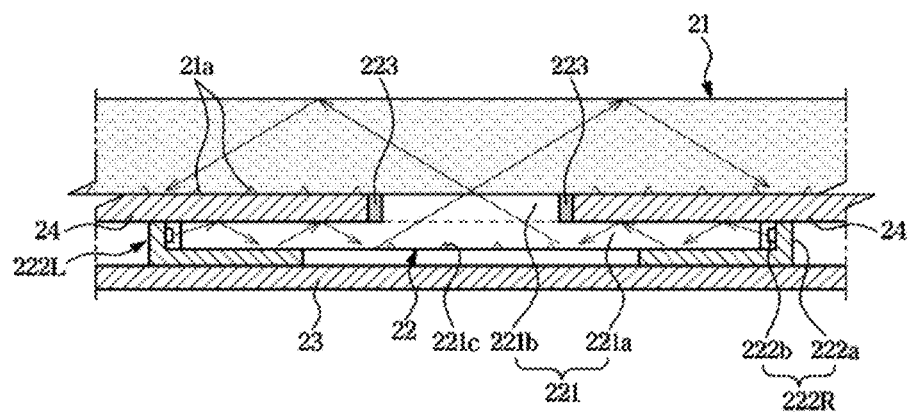
FIG. 4 is a cross-sectional view illustrating the backlight included in the display apparatus according to the first embodiment of the disclosure.

Referring to FIGS. 3 and 4, the light guide plate 21 is formed in a rectangular plate shape having a width in a left and right side direction that is longer than a length in an upper and lower side direction to correspond to the shape of the display panel 10, and is formed of a transparent material so that light may pass therethrough.

The light guide plate 21 includes a fine pattern 21a formed on the rear surface thereof so that light passing through the light guide plate 21 is emitted forward of the light guide plate 21. The fine patterns 21a are formed as grooves having a triangular cross section, and are arranged to be spaced apart from each other by a predetermined interval.

The fine pattern 21a is limitedly formed only in a region except for a region that comes in contact with the front surface of a light guide member 221 to be described below, so that the light emitted from the front surface of the light guide member 221 may be easily incident into the light guide plate 21.

The fine pattern 21a may be formed as semicircular grooves or hemispherical grooves. In addition, the fine pattern may be formed as white ink printed on the rear surface of the light guide plate 21.

The light source units 22 are disposed on the rear side of the light guide plate 21 to be spaced apart from each other in the left side and right side direction. Each of the light source units 22 includes the light guide member 221 arranged to have a front surface thereof come in contact with the rear surface of the light guide plate 21 while in optical contact with the rear surface of the light guide plate 21 and a light source 222 supplying light to the light guide plate 21.

As described above, since the light source units 22 are arranged on the rear side of the light guide plate 21, the display apparatus may have a bezel portion with a reduced width.

The light guide member 221 includes a light guide portion 221a formed of a transparent material to allow light to pass therethrough and configured to guide the light from the light source 222 to be supplied in the width direction and an exit portion 221b protruding forward from the light guide portion 221a to guide light to be emitted toward the rear surface of the light guide plate 21 located on the front side of the light guide portion 221a.

The light guide portion 221a is formed in a rectangular shape having a length in the upper side and lower side direction that is longer than a width in the left side and right side direction. In the drawing, the upper side and lower side direction is the length direction of the light guide portion 221a, the left side and right side direction is the width direction of the light guide portion 221a, in which the length direction of the light guide portion 221a and the width direction of the light guide portion 221a are perpendicular to each other.

The light guide member 221 includes a fine pattern 221c provided on the rear surface of the light guide portion 221a. The fine pattern 221c provided on the rear surface of the light guide portion 221a is formed in the same type as the fine pattern 21a formed on the rear surface of the light guide plate 21 described above, and allows light passing therethrough to be emitted forward.

The fine pattern 221c formed on the rear surface of the light guide portion 221a is limitedly formed only at a position corresponding to the front surface of the light guide member 221 that comes in contact with the light guide plate 21, that is, the front surface of the exit portion 221b, so that the fine pattern 221c allows light passing through the light guide portion 221c in the width direction to be guided to the exit portion 221b in front of the light guide portion 221c.

The exit portion 221b protrudes from the central portion of the front surface of the light guide portion 221a to the front to be disposed so that the front surface of the exit portion 221b comes in contact with the rear surface of the light guide plate 21. The front surface of the exit portion 221b comes in optical contact with the rear surface of the light guide plate 21.

In addition, the light guide member 221 includes a pair of reflectors 223 formed on widthwise both side surfaces of the exit portion 221b. The reflectors 223 on the exit portion 221b are formed as sheets of mirror material attached to the both side surfaces of the exit portion 221b, and prevent light from leaking through widthwise both side surfaces of the exit portion 221b.

The light source 222 includes a pair of substrates 222a disposed opposite to widthwise both side surfaces of the light guide portion 221a, and a plurality of light emitting diodes (LEDs) 222b disposed on the substrates 222a. Among the illustrated light sources 222, the light source 222 positioned on the left side is referred to as a first light source 222L, and the light source 222 positioned on the right side is referred to as a second light source 222R.

Most of the light generated from the first light source 222L on the left side region is emitted forward through a right region of the light guide plate 21, and most of the light generated from the second light source 222R on the right side region is emitted forward through a left region of the light guide plate 21. Therefore, by selectively operating the first light source 222L and the second light source 222R, the amount of light emitted from both side regions with respect to the light source unit 22 may be individually adjusted.

The substrates 222a are formed to have an L-shaped cross section and are disposed lengthways to correspond to the widthwise both side surfaces of the light guide portion 221a. The LEDs 222b are installed on one side of the substrate 222a facing the side surface of the light guide portion 221a, and the other side of the substrate 222a extending parallel to the light guide portion 221a is supported on the rear surface of the light guide portion 221a.

Further, the backlight 20 includes one reflector 23 covering the rear surface of the light source unit 22, and another reflector 24 covering the rear surface of the light guide plate 21 and the front surface of the light guide portion 221a. The reflectors 23 and 24 covering the rear surface of the light guide plate 21 and the rear surface of the light source unit 22 are each formed of a white reflective sheet.

The LEDs 222b are disposed spaced apart from each other in the upper side and lower side direction on the substrate 222a arranged lengthways in the upper side and lower side direction. Since the light emitting diodes 222b may be individually controlled, regions of the light guide plate 21 may be divided in the upper side and lower side direction to be supplied with light by controlling whether to operate the LEDs 222b.

The optical sheets 30 include a diffuser sheet 31 receiving light emitted forward from the light guide plate 21 and diffuses the light, a Dual Brightness Enhancement Film, DBEF) sheet 32, that is, a high-brightness prism sheet, disposed on the front side of the diffuser sheet 31, a quantum dot sheet 33 improving color reproducibility, and the like.

Figure 5:
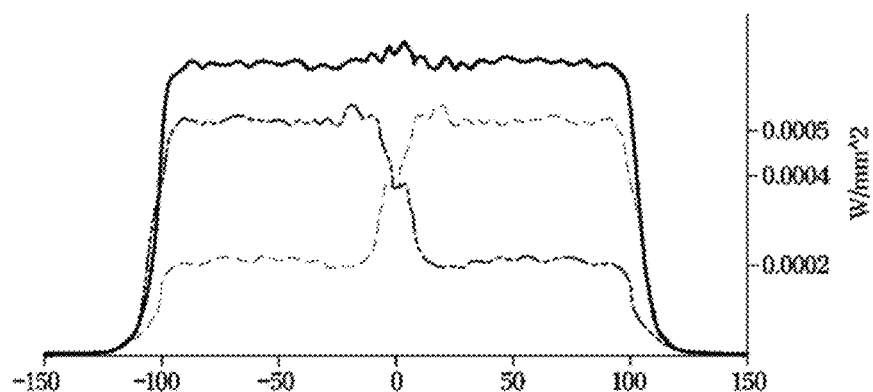
FIG. 5 is a graph showing the amount of light generated from a light source unit included in a display apparatus according to an embodiment of the disclosure.

FIG. 5 is a graph showing the amount of light emitted from the light guide plate 21 when light is supplied from the light source units 222.

In FIG. 5, distribution of light emitted from the light guide plate 21 based on the light supplied from the first light source 222L is shown in a dotted line in the drawing, and distribution of light emitted from the light guide plate 21 based on the light supplied from the second light source is shown in a two-dot chain line. Distribution of light emitted from the light guide plate 21 based on the light supplied from both light sources 222 is shown by a solid line in the drawing.

Therefore, one of the first light source 222L and the second light source 222R may be operated to allow light to be sufficiently emitted to the display panel 10 only through one of the left side region and the right side region with respect to the light source unit 22, or both the first light source 222L and the second light source 222R may be operated to allow light to be sufficiently emitted to the display panel 10 through both the left and right side regions.

In addition, since the LEDs 222*b* are controlled to adjust the amount of light emitted from the light guide plate 21 at each region divided along the upper side and lower side direction as the above, the distribution of light emitted from the light guide plate 21 to the display panel 10 may be finely controlled by regions divided in the upper side and lower side direction and the left and right side direction. Accordingly, the local dimming function of the display apparatus may be more efficiently performed.

In the above, the light source units 22 are illustrated as supplying light by being disposed to be spaced apart from each other in the left side and right side direction, so that the regions of the light guide plate 21 are divided in the left side and right side direction with respect to the position where the light source unit 22 is installed, but the disclosure is not limited thereto.

Alternatively, the light source units 22 may supply light being be disposed to be spaced apart from each other in the upper side and lower side direction so that the regions of the light guide plate 21 are divided in the upper side and lower side direction with respect to the position where the light source unit 22 is installed. In this case, the light guide member 221 is formed in a rectangular shape having a length in the left side and right side direction that is longer than a width in the upper side and lower side direction, and the light sources 222 supply light through an upper surface and a lower surface of the light guide portion 221*a* of the light guide member 221.

In the above, the light guide portion 221*a* and the exit portion 221*b* of the light guide member 221 are illustrated as being integrally formed with each other, but the disclosure is not limited thereto. The light guide member 221 may be formed by separately manufacturing the light guide portion 221*a* and the exit portion 221*b* and then attaching the exit portion 221*b* to the front surface of the light guide portion 221*a*.

Hereinafter, a light source unit 22 included in the display apparatus according to the second embodiment of the disclosure will be described.

Figure 6:
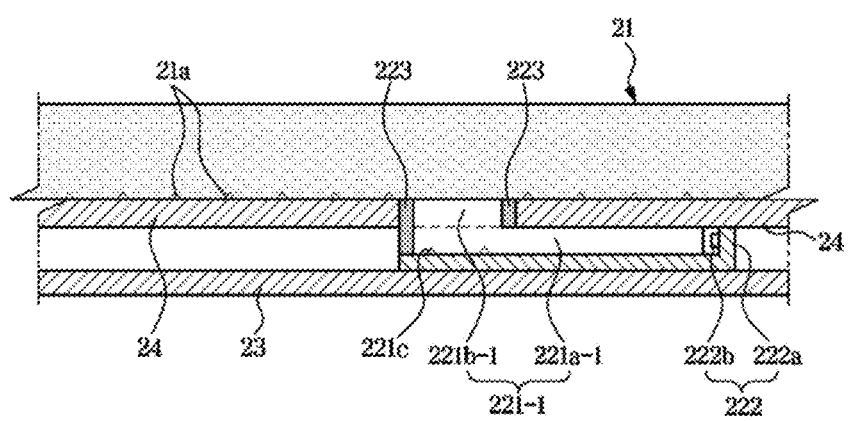
FIG. 6 is a cross-sectional view illustrating a backlight included in a display apparatus according to the second embodiment of the disclosure.

Referring to FIG. 6, the light source unit 22 includes a light guide member 221-1 and one light source 222 that supplies light to the light guide member 221-1. The light guide member 221-1 includes a light guide portion 221*a*-1 formed in a rectangular plate shape having a length in the upper side and lower side direction that is longer than a width of in the left side and right side direction, and an exit portion 221*b*-1 protruding forward from the front surface at one side (the left side in the drawing) of the light guide portion 221*a*-1 and having a front surface thereof come in contact with the rear surface of the light guide plate 21.

The light source 222 has a substrate 222*a* disposed opposite to the other side (the right side in the drawing) of the light guide portion 221*a*-1 located on the opposite side of the exit portion 221*b*-1 and a plurality of light emitting diodes 222*b* disposed on the substrate 222*a* while being spaced apart from being each other in the upper side and lower side direction.

In addition, the light guide member 221-1 includes one reflector 223 covering one side surface between the widthwise both side surface of the light guide portion 221*a*-1 and one side surface between the widthwise both side surfaces of the exit portion 221*b*-1 and another reflector 223 covering the other side surface between the widthwise both side surfaces of the exit portion 221*b*-1. Each of the two reflectors 223 is formed of a mirror material.

Accordingly, light emitted from the light source 222 is emitted to the display panel 10 through the left side region of the light guide plate 21 with respect to the exit portion 221*b*-1 of the light source unit 22.

In the above, the exit portion 221*b*-1 is illustrated as protruding from the left side of the front surface of the light guide portion 221*a*-1, but the disclosure is not limited thereto. That is, although not shown in the drawing, the exit portion may protrude from the front surface at the right side of the light guide portion. In addition, although not shown, a light guide member having an exit portion protruding from the front left side of the light guide portion and a light guide member having an exit portion protruding from the front right side of the light guide portion may be alternately arranged.

Hereinafter, a light source unit 22 included in a display apparatus according to the third embodiment of the disclosure will be described.

Figure 7:
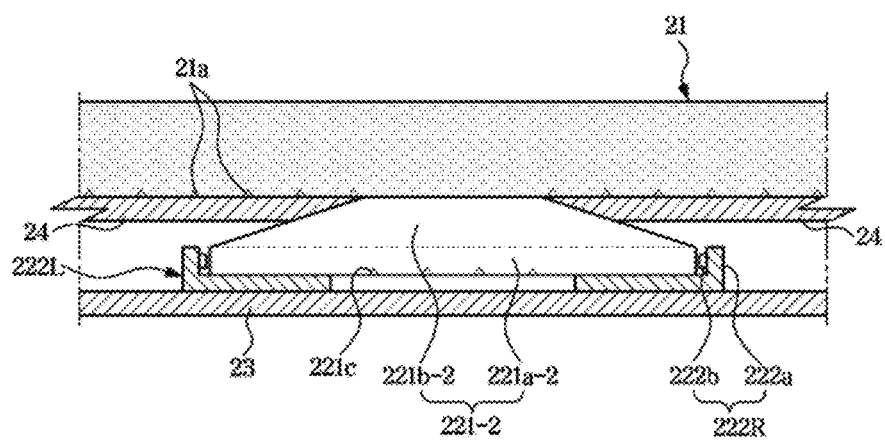
FIG. 7 is a cross-sectional view illustrating a backlight included in a display apparatus according to the third embodiment of the disclosure.

Referring to FIG. 7, the light source unit 22 includes a light guide member 221*a*-2 and a pair of light sources 222 for supplying light to the light guide member 221-2.

The light guide member 221-2 includes a light guide portion 221*a*-2 formed in the shape of a rectangular plate having a length in the upper side and lower side direction that is longer than a width in the left side and right side direction and an exit portion 221*b*-2 protruding from the light guide portion 221*a*-2 to have a width gradually decreasing from the light guide portion 221*a*-2 so that a front surface (the upper surface in the drawing) of the exit portion 221*b*-2 comes in contact with the rear surface of the light guide plate 21. That is, widthwise both side surfaces of the exit portion 221*b*-2 are formed to be inclined toward the light guide plate 21 in front of the exit portion 221*b*-2.

The light source 222 includes a pair of substrates 222*a* disposed opposite to the widthwise both side surfaces of the light guide portion 221*a*-2 and a plurality of light emitting diodes 222*b* disposed on the pair of substrates 222*a* to be spaced apart from each other in the upper side and lower side direction.

When the widthwise both side surfaces of the exit portion 222*b*-2 are formed to be inclined as described above, light generated from the light sources 222 may more easily reach the opposite side region. That is, light generated from the first light source 222L on the left side may be emitted through the right side region of the light guide plate 21 in a larger amount, and light generated from the second light source 222R on the right side may be emitted through the left side region of the light guide plate 21 in a larger amount. Accordingly, the local dimming function may be more efficiently performed in the display apparatus.

Although few embodiments of the disclosure have been shown and described, the above embodiment is illustrative purpose only, and it would be appreciated by those skilled in the art that changes and modifications may be made in these embodiments without departing from the principles and scope of the disclosure, the scope of which is defined in the claims and their equivalents.

The invention claimed is:

1. A display apparatus comprising:
a display panel; and
a backlight arranged at a rear side of the display panel to supply light to the display panel,
wherein the backlight includes:
a light guide plate formed of a transparent material and arranged behind the display panel and a plurality of light source units disposed to be spaced apart from each other to supply light to a rear surface of the light guide plate; and the plurality of light source units include a light guide member formed of a transparent material and having a front surface come in contact with the rear surface of the light guide plate and a light source configured to supply light toward the light guide member, wherein the light guide member includes a light guide portion having a width, and a length that is longer than the width, and configured to guide the light from the light source to be supplied in a direction along the width, and an exit portion protruding forward from the light guide portion to guide the light to be emitted toward the rear surface of the light guide plate, wherein the light source is disposed on at least one of widthwise both side surfaces of the light guide portion, wherein the light guide plate includes a first fine pattern provided on the rear surface thereof and configured to guide light to be emitted forward, and the first fine pattern is formed on the rear surface of the light guide plate except for a region that comes in contact with the front surface of the exit portion of the light guide member, wherein the light guide member includes a second fine pattern provided on a rear surface of the light guide portion and configured to guide light to be emitted forward, and the second fine pattern is formed on the rear surface of the light guide member at a position corresponding to the front surface of the exit portion of the light guide member that comes in contact with the light guide plate, and wherein the light guide member includes a pair of reflectors disposed on widthwise both side surfaces of the exit portion to reflect light.

2. The display apparatus of claim 1, wherein the exit portion protrudes forward from a center portion of a front surface of the light guide portion such that a front surface of the exit portion comes in contact with the rear surface of the light guide plate.

3. The display apparatus of claim 2, wherein the light source includes a pair of substrates disposed opposite to widthwise both side surfaces of the light guide portion, and a plurality of light emitting diodes (LEDs) disposed on the pair of substrates to be spaced apart from each other lengthwise along the light guide plate.

4. The display apparatus of claim 1, wherein the exit portion protrudes forward from a front surface of the light guide portion at one of widthwise both sides thereof to come in contact with the rear surface of the light guide plate.

5. The display apparatus of claim 4, wherein the light source includes a substrate disposed opposite to another side surface of the light guide portion located on the opposite side of the exit portion between widthwise both side surfaces of the light guide portion and a plurality of LEDs disposed on the substrate to be spaced apart from each other lengthwise along the light guide portion.

6. The display apparatus of claim 5, wherein one of the pair of reflectors covers one side surface between the widthwise both side surfaces of the light guide portion and one side surface between widthwise both side surfaces of the exit portion and the other of the pair of reflectors covers another side surface between the widthwise both side surfaces of the exit portion.

7. The display apparatus of claim 1, wherein the exit portion protrudes to have a width that gradually decreases as being directed from the light guide portion toward the rear surface of the light guide plate so that a front surface of the exit portion comes in contact with the rear surface of the light guide plate.

8. The display apparatus of claim 7, wherein the light source includes a pair of substrates disposed opposite to widthwise both side surfaces of the light guide portion, and a plurality of light emitting diodes (LEDs) disposed on the pair of substrates to be spaced apart from each other lengthwise along the light guide portion.

9. The display apparatus of claim 1, wherein the backlight further includes reflectors covering the rear surface of the light guide plate and a rear surface of the light source unit.

10. The display apparatus of claim 1, wherein the plurality of light source units are disposed on the rear surface of the light guide plate to be spaced apart from each other in a left side and right side direction,
- the light guide member is elongated in an upper side and lower side direction,
- the substrate is disposed opposite to at least one of a left side surface and a right side surface of the light guide portion, and
- the plurality of LEDs are disposed on the substrate to be spaced apart from each other in the upper side and lower side direction.

* * * * *